United States Patent
Park et al.

(10) Patent No.: US 8,699,480 B2
(45) Date of Patent: Apr. 15, 2014

(54) METHOD OF OPERATING TUNNEL POINT SUPPORTING ROUTING SCALABILITY AND MOBILITY

(75) Inventors: Jung-Soo Park, Daejeon (KR); Hyoung-Jun Kim, Daejeon (KR); Tae-Wan You, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 883 days.

(21) Appl. No.: 12/568,448

(22) Filed: Sep. 28, 2009

(65) Prior Publication Data

US 2010/0157894 A1 Jun. 24, 2010

(30) Foreign Application Priority Data

Dec. 18, 2008 (KR) .................. 10-2008-0129554

(51) Int. Cl.
*H04J 3/24* (2006.01)
(52) U.S. Cl.
USPC ...... 370/349; 455/432.1; 455/433; 455/435.1
(58) Field of Classification Search
None
See application file for complete search history.

(56) References Cited

U.S. PATENT DOCUMENTS

| | | | | |
|---|---|---|---|---|
| 5,878,347 | A * | 3/1999 | Joensuu et al. | 455/433 |
| 6,359,880 | B1 * | 3/2002 | Curry et al. | 370/352 |
| 6,442,616 | B1 * | 8/2002 | Inoue et al. | 709/245 |
| 6,456,839 | B1 * | 9/2002 | Chow et al. | 455/408 |
| 6,732,177 | B1 * | 5/2004 | Roy | 709/227 |
| 6,915,325 | B1 * | 7/2005 | Lee et al. | 709/202 |
| 6,947,432 | B2 * | 9/2005 | Roy | 370/401 |
| 7,079,520 | B2 * | 7/2006 | Feige et al. | 370/338 |
| 7,277,416 | B1 * | 10/2007 | Chang et al. | 370/338 |
| 7,293,107 | B1 | 11/2007 | Hanson et al. | |
| 7,447,183 | B1 | 11/2008 | Leung | |
| 7,969,945 | B2 * | 6/2011 | Navali et al. | 370/331 |

(Continued)

FOREIGN PATENT DOCUMENTS

| | | |
|---|---|---|
| JP | 2005-130512 | 5/2005 |
| JP | 2008-524908 | 7/2008 |
| KR | 1020020073779 | 9/2002 |
| KR | 1020050037397 | 4/2005 |

OTHER PUBLICATIONS

Farinacci, D. et al., "LISP Alternative Topology (LISP+ALT)," retrieved online at http://tools.ietf.org/html/draft-ietf-lisp-alt-01 (2008).

(Continued)

*Primary Examiner* — Ian N Moore
*Assistant Examiner* — Dung B Huynh
(74) *Attorney, Agent, or Firm* — Nelson Mullins Riley & Scarborough LLP; Anthony A. Laurentano, Esq.

(57) ABSTRACT

Provided is a method of operating a tunnel point that provides a tunnel between a router group including at least one router and a mobile node. The method includes: providing a tunnel between the mobile node and the router group by authenticating the mobile node; receiving a packet including an identifier (ID) of a target node from the mobile node; converting the ID of the target node in the packet into a locator corresponding to the ID of the target node; transmitting a packet including the converted locator to the router group; and maintaining the ID of the mobile node by authenticating the mobile node through the router group when the mobile node is connected to another external terminal node.

11 Claims, 7 Drawing Sheets

(56) References Cited

U.S. PATENT DOCUMENTS

| | | | |
|---|---|---|---|
| 2001/0031635 A1* | 10/2001 | Bharatia | 455/432 |
| 2002/0027915 A1* | 3/2002 | Foti et al. | 370/392 |
| 2002/0133534 A1* | 9/2002 | Forslow | 709/200 |
| 2003/0142673 A1* | 7/2003 | Patil et al. | 370/392 |
| 2003/0219023 A1* | 11/2003 | Miyata et al. | 370/395.53 |
| 2003/0225912 A1* | 12/2003 | Takeda et al. | 709/246 |
| 2004/0103212 A1* | 5/2004 | Takeuchi et al. | 709/245 |
| 2004/0120294 A1* | 6/2004 | Yang et al. | 370/338 |
| 2004/0146042 A1* | 7/2004 | Ideshita et al. | 370/349 |
| 2004/0179508 A1* | 9/2004 | Thubert et al. | 370/349 |
| 2004/0202183 A1* | 10/2004 | Thubert et al. | 370/395.31 |
| 2005/0266846 A1* | 12/2005 | Kim | 455/436 |
| 2006/0018291 A1* | 1/2006 | Patel et al. | 370/335 |
| 2006/0062176 A1* | 3/2006 | Ikemura et al. | 370/328 |
| 2006/0080380 A1* | 4/2006 | Aizu et al. | 709/203 |
| 2007/0147421 A1* | 6/2007 | Kim | 370/466 |
| 2008/0071927 A1* | 3/2008 | Lee | 709/245 |
| 2010/0246509 A1* | 9/2010 | Chen | 370/329 |

OTHER PUBLICATIONS

Farinacci, D. et al., "Locator/ID Separation Protocol (LISP)," retrieved online at http://tools.ietf.org/html/draft-farinacci-lisp-12 (2008).

You, T.W. et al., "Identifier/Locator, An Advent of New Challenges of IP Architecture: Technology and Standard Trends of Identifier and Locator Split from IP Address," Electronics and Telecommunications Trends, vol. 20(4):1-9 (2005).

* cited by examiner

METHOD OF OPERATING TUNNEL POINT SUPPORTING ROUTING SCALABILITY AND MOBILITY

CROSS-REFERENCE TO RELATED APPLICATIONS

This U.S. non-provisional patent application claims priority under 35 U.S.C. §119 of Korean Patent Application No. 10-2008-0129554, filed on Dec. 18, 2008, the entire contents of which are hereby incorporated by reference.

BACKGROUND OF THE INVENTION

The present invention disclosed herein relates to a network system.

Network is realized based on internet protocol version 4 (IPv4). Each node connected to the network has an allocated Internet protocol (IP) address. When one node transmits a packet to a target node, the transmitted packet includes IP address of the target node. The IP address of the target node in the packet is an identifier of the target node and also is a locator that is referenced to allow routers of the network to deliver the packet to the target node.

Recently, services via network such as Internet protocol television (IPTV) and voice over Internet protocol (VoIP) are commercialized. As the services via network are increased, routing scalability in network needs to accommodate new growing users.

Devices for communicating data via network with mobility such as a personal digital assistant (PDA) and a portable computer are increased. As mobile devices utilizing network are increased, routing and mobility management are required in network.

SUMMARY OF THE INVENTION

The present invention provides a tunneling point supporting routing scalability and mobility.

Embodiments of the present invention provide methods of operating a tunnel point that provides a tunnel between a router group including at least one router and a mobile node include: providing a tunnel between the mobile node and the router group by authenticating the mobile node; receiving a packet including an identifier (ID) of a target node from the mobile node; converting the ID of the target node in the packet into a locator corresponding to the ID of the target node; transmitting a packet including the converted locator to the router group; and maintaining the ID of the mobile node by authenticating the mobile node through the router group when the mobile node is connected to another external terminal node.

In some embodiments, the tunnel point includes an authentication server in order for authenticating the mobile node; and the providing of the tunnel between the mobile node and the router group includes authenticating the mobile node by using the authentication server and the ID of the mobile node and providing a tunnel between the mobile node and the router group based on an authentication result.

In other embodiments, when the mobile node is authenticated in order to provide a tunnel between the mobile node and the router group, the methods further include allocating ID to the mobile node through the authentication server if there is no ID of the mobile node.

In still other embodiments, the providing of the tunnel between the mobile node and the router group includes, when the ID of the mobile node is not allocated by the tunnel point, requesting authentication of the mobile node to a tunnel point that allocates ID to the mobile node among external tunnel points.

In even other embodiments, the providing of the tunnel between the mobile node and the router group includes: converting the ID of the mobile node into a locator; and transmitting the converted locator and an authentication request of the mobile node to the router group.

In yet other embodiments, the providing of the tunnel between the mobile node and the router group includes, when an authentication message of the mobile node is delivered through the router group, providing a tunnel between the mobile node and the router group.

In further embodiments, when a specific mobile node to which the tunnel point allocates ID is connected to another external tunnel point, the methods further include storing specific mobile node information indicating that the mobile node to which the tunnel point allocates the ID is connected to another external tunnel point.

In still further embodiments, when a packet to be delivered from the router group to the specific mobile node is delivered, the methods further include combining the packet to be delivered to the specific mobile node with a locator representing an external tunnel point to which the specific mobile node is connected, based on the specific mobile node information, in order to deliver a combined result to the router group.

In even further embodiments, the tunnel point includes: a global tunnel point; and at least one local tunnel point connected to the global tunnel point. The mobile node is connected to one of the at least one local tunnel point and when the mobile node is connected to the first local tunnel point, the first local tunnel point delivers the ID of the mobile node to the global tunnel point, and the global tunnel pint authenticates the mobile node using the ID of the mobile node and the authentication server.

In yet further embodiments, when the mobile node is separated from the first local tunnel point and is connected to the second local tunnel point, the ID of the mobile node is maintained.

In yet further embodiments, when the packet including the locator corresponding to the tunnel point is delivered from the router group, the methods further include: converting the locator corresponding to the tunnel point into ID; and delivering the packet to the mobile node when the converted ID corresponds to the mobile node.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

According to an embodiment of the present invention, a method of operating a tunnel point that provides a tunnel between a router group including at least one router and a mobile node includes: providing a tunnel between the mobile node and the router group by authenticating the mobile node; receiving a packet including an identifier (ID) of a target node from the mobile node; converting the ID of the target node in the packet into a locator corresponding to the ID of the target node; transmitting a packet including the converted locator to the router group; and maintaining the ID of the mobile node by authenticating the mobile node through the router group when the mobile node is connected to another external terminal node.

Hereinafter, the embodiments of the present invention will be described clearly with reference to the accompanying drawings such that those skilled in the art can realize the technical scopes of the present invention without difficulties.

Figure 1:
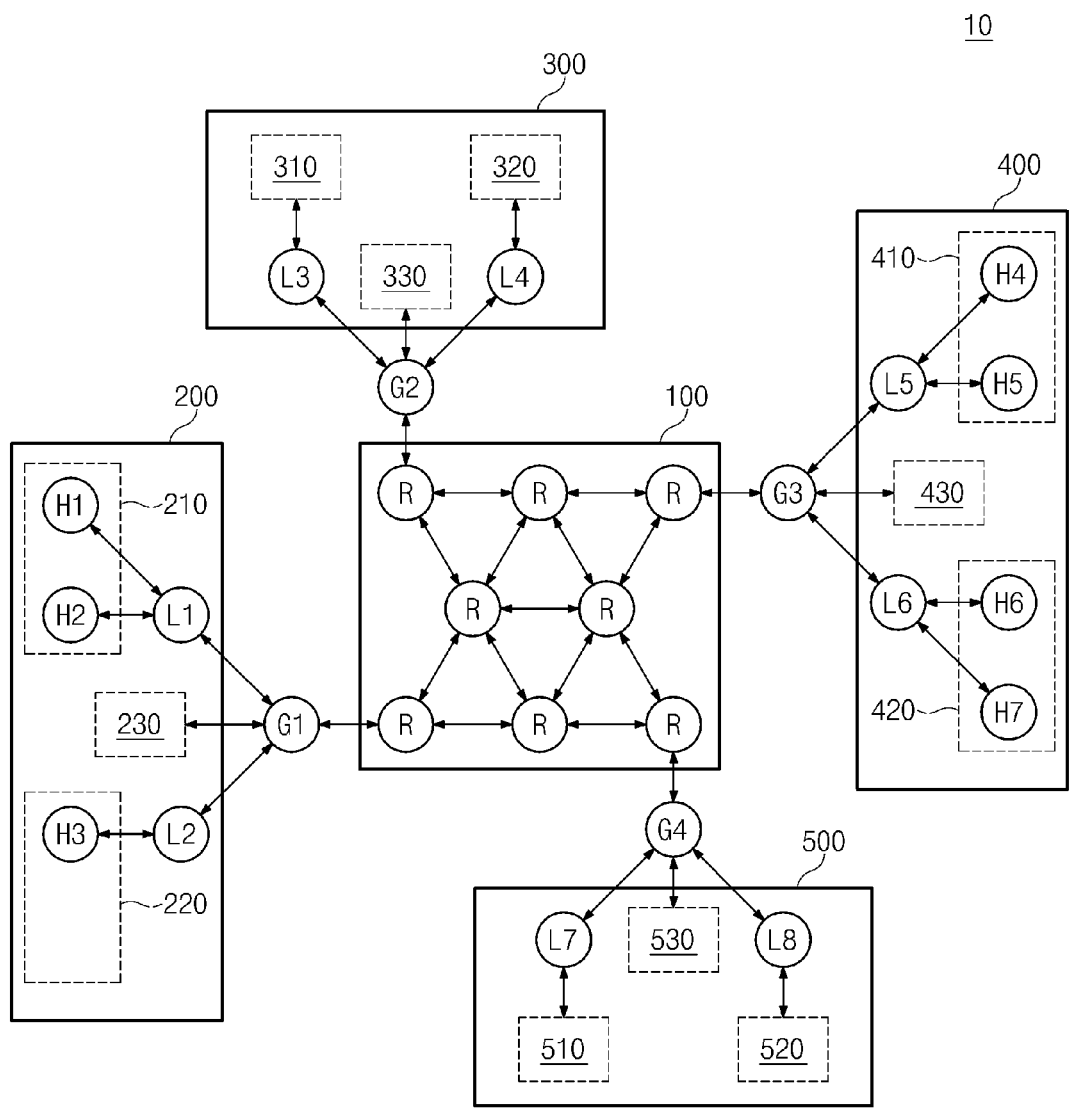
FIG. 1 is a block diagram of a network system according to an embodiment of the present invention.

FIG. 1 is a block diagram of a network system 10 according to an embodiment of the present invention. Referring to FIG. 1, the network system 10 includes a network 100, global mobility tunnel points G1 to G4, and end areas 200 to 500.

The network 100 includes at least one router R. The network 100 provides a tunnel between a plurality of global tunnel point G1 to G4. For example, the network 100 provides a tunnel between four global tunnel points G1 to G4. However, it should be understood that the present invention is not limited to the above.

The global mobility tunnel points G1 to G4 are connected between the end areas 200 to 500 and the network 100 respectively. The global mobility tunnel points G1 to G4 provide a tunnel between the end areas 200 to 500 and the network 100 respectively. The end areas 200 to 500 are areas where nodes connected to the network 100 through the global mobility tunnel points G1 to G4.

For example, nodes placed in the end area 200 are connected to the network 100 through the global mobility tunnel point G1. Nodes placed in the end area 300 are connected to the network 100 through the global mobility tunnel point G2. Nodes placed in the end area 400 are connected to the network 100 through the global mobility tunnel point G3. Moreover, nodes placed in the end area 500 are connected to the network 100 through the global mobility tunnel point G4. The global mobility tunnel points G1 to G4 provide a tunnel between nodes of the end areas 200 to 500 and the network 100.

The network 10 supports separation of an identifier from a locator. For example, the nodes of the end areas 200 to 500 connected to the global mobility tunnel points G1 to G4 will be identified by an identifier (ID). When the node of the end area 200 transmits a packet to the node of the end area 400, the packet transmitted from the node of the end area 200 to the node of the end area 400 may include ID of a target node of the end area 400.

The global mobility tunnel point G1 receives the packet including the ID of the target node from the node of the end area 200 and coverts the ID of the target node into a locator that is corresponding to the ID of the target node. The global mobility tunnel point G1 will deliver the packet including the locator of the target node to the network 100. At least one router R of the network 100 delivers the packet to the global mobility tunnel point G3 with reference to the locator of the target node. The global mobility tunnel point G3 converts the locator of the target node in the packet into the ID of the target node. The global mobility tunnel point G3 delivers the packet to the target node among nodes connected to the end area 400, with reference to the ID of the target node.

For example, the global mobility tunnel points G1 to G4 serve as an ingress tunnel router (ITR) that detects the ID corresponding to the locator and encapsulates it and an engress tunnel router (ETR) that detects a locator corresponding to ID and encapsulates it.

For example, the network system 10 is based on a locator/identifier separation protocol (LISP). For example, the network 100 is based on alternative logical topology (ALT). For example, the LISP/ALT of the network system 10 is a regulation suggested by international engineering task force (IETF).

The network system 10 provides mobility. For example, even when the node in the end area 200, which communicates with the network 100 via the global mobility tunnel point G1, moves into the end area 400 and then communicates with the global mobility tunnel point G3, the same ID is maintained.

For example, nodes connected to the end areas 200 to 500 may be a terminal, a host, a client, and a mobile router. For example, the global mobility tunnel points G1 to G4 may be one of various routers or gateways.

The end area 200 includes at least one of local mobility tunnel points L1 and L2. For example, the end area 200 includes two local mobility tunnel points L1 and L2. However, it should be understood that the present invention is not limited thereto.

The end area 200 includes local areas 210 and 220 connected to the local mobility tunnel points L1 and L2, respectively. The local mobility tunnel points L1 and L2 provide a tunnel between the local areas 210 and 220 and the global mobility tunnel point G2. The local area 210 includes at least one node connected to the local mobility tunnel point L1. As illustrated, two nodes H1 and H2 are connected to the local mobility tunnel point L1. The local area 220 includes at least one node connected to the local mobility tunnel point L2. One node H3 is connected to the local mobility tunnel point L2.

For example, nodes H1 to H3 connected to the local areas 210 and 220 may be a terminal, a host, a client, and a mobile router. The local mobility tunnel points L1 and L2 may be one of various routers or gateways.

A new node that is connected first to the end area 200 may be allocated with ID from the global mobility tunnel point G1 of the end area 200. The allocated ID is maintained when the node moves from the end area 200 to another area. The global mobility tunnel point G1 operates as a home agent of the node to which the global mobility tunnel point G1 allocates ID.

The end area 200 further includes an authentication server 230. The authentication server 230 stores information of nodes registered in the global mobility tunnel point G1 and information necessary for authenticating nodes that request connections to the global mobility tunnel point G1. In the drawings, the authentication server 230 is separated from the global mobility tunnel point G1 and is placed in the end area 200. However, the position of the authentication server 230 is not limited thereto. The authentication server 230 may be included in the global mobility tunnel point G1 or may be placed being separated from the global mobility tunnel point G1 and the end area 200. The authentication server 230 communicates with the global mobility tunnel point G1 to authenticate nodes connected to the end area 200. For example, the authentication server 230 may be an authentication, authorization, accounting (AAA) server.

Like the end area 200 connected to the global mobility tunnel point G1, the end area 300 connected to the global mobility tunnel point G2 includes local mobility tunnel points L3 and L4, local areas 310 and 320 connected to the local mobility tunnel point L3 and L4, respectively, and an authentication server 330. The local mobility tunnel points L3 and L4 provide a tunnel between the local areas 310 and 320 and the global mobility tunnel point G2. The authentication server 330 authenticates nodes connected to the global mobility tunnel point G2 and registered in the global mobility tunnel point G2.

The local area 310 includes at least one node connected to the local mobility tunnel point L3. The local area 320 includes at least one node connected to the local mobility tunnel point L4. The nodes connected to the local areas 310 and 320 may be a terminal, a host, a client, and a mobile router. The local mobility tunnel points L3 and L4 may be one of various routers or gateways. Characteristics of the global mobility tunnel point G2 and the end area 300 are the same as those of the global mobility tunnel point G1 and the end area 200. Accordingly, its detailed description will be omitted.

Like the end area 200 connected to the global mobility tunnel point G1, the end area 400 connected to the global mobility tunnel point G3 includes local mobility tunnel points L5 and L6, local areas 410 and 420 connected to the local mobility tunnel points L5 and L6, respectively, and an authentication server 430. The local mobility tunnel points L5 and L6 provide a tunnel between the local areas 410 and 420 and the global mobility tunnel point G3. The authentication server 430 authenticates nodes connected to the global mobility tunnel point G3 and registered in the global mobility tunnel point G3.

The local area 410 connected to the local mobility tunnel point L5 includes at least one node. Nodes H4 and H5 are connected to the local mobility tunnel point L5. The local area 420 connected to the local mobility tunnel point L6 includes at least one node. Nodes H6 and H7 are connected to the local mobility tunnel point L6. Nodes connected to the local areas 410 and 420 may be a terminal, a host, a client, and a mobile router. The local mobility tunnel points L5 and L6 may be one of various routers or gateways. Characteristics of the global mobility tunnel point G3 and the end area 400 are the same as those of the global mobility tunnel point G1 and the end area 200. Accordingly, its detailed description will be omitted.

Like the end area 200 connected to the global mobility tunnel point G1, the end area 500 connected to the global mobility tunnel point G4 includes local mobility tunnel points L7 and L8, local areas 510 and 520 connected to the mobility tunnel points L7 and L8, respectively, and an authentication server 530. The local mobility tunnel points L7 and L8 provide a tunnel between the local areas 510 and 520 and the global mobility tunnel point G4. The authentication server 530 authenticates nodes connected to the global mobility tunnel point G4 and registered in the global mobility tunnel point G4.

The local area 510 includes at least one node connected to the local mobility tunnel point L7. The local area 520 includes at least one node connected to the local mobility tunnel point L8. Nodes connected to the local areas 510 and 520 may be a terminal, a host, a client, and a mobile router. The local mobility tunnel points L7 and L8 may be one of various routers or gateways. Characteristics of the global mobility tunnel point G4 and the end area 500 are the same as those of the global mobility tunnel point G1 and the end area 200. Accordingly, its detailed description will be omitted.

The network system 10 supports a separated ID/locator structure. Accordingly, routing scalability of the network system 10 can be enhanced. The network system 10 provides local mobility and global mobility.

The local mobility tunnel points L1 to L8 provide local mobility and the global mobility tunnel points G1 to G4 provide global mobility. In an end area (e.g., 200) connected to an identical global mobility tunnel point (e.g., G1), when a node (e.g., H1) of a local area (e.g., 210) connected to one local mobility tunnel point L1 moves into a local area (e.g., 220) connected to another local mobility tunnel point (e.g., L2), the local mobility tunnel points L1 and L2 provide local mobility. That is, even when a node (e.g., H1) moves from the local area 210 to the local area 220, the ID of a node (e.g., H1) is maintained.

When a node of an end area (e.g., 200) connected to one global mobility tunnel point (e.g., G1) moves to an end area (e.g., 300) connected to another global mobility tunnel point (e.g., G2), the global mobility tunnel points G1 and G2 provide global mobility. That is, when a node (e.g., H1) moves from the end area 200 to the end area 300, the ID of a node (e.g., H1) is maintained.

Each end area may be a home network. For example, the end area 200 may be understood as one house, and the local areas 210 and 200 may be understood as rooms in the house. The end area 200 may be understood as one building and the local areas 210 and 220 may be understood as stories or rooms in the building.

Hereinafter, referring to FIGS. 2 through 7, a method of providing mobility in the network system 100 will be described in more detail.

Figure 2:
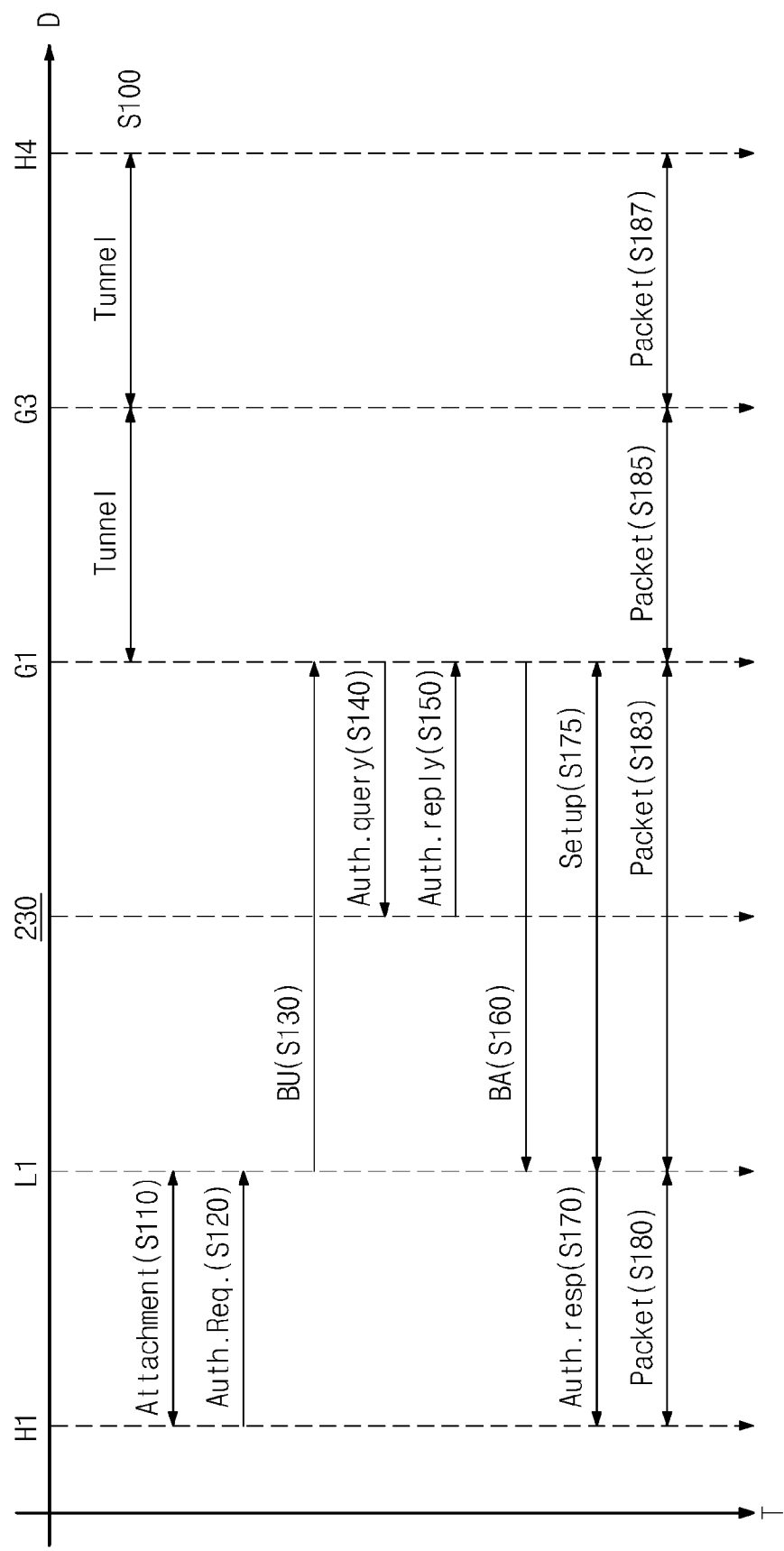
FIG. 2 is a diagram illustrating an operation of a network system according to an embodiment of the present invention.

FIG. 2 is a diagram illustrating an operation of the network system 10 according to an embodiment of the present invention. In FIG. 2, an x-axis represents components D of the network system 10 and a y-axis represents time T.

Hereinafter, referring to FIGS. 1 and 2, a method of creating a tunnel between the mobile node H1 of the local area 210 in the network system 10 and the global mobility tunnel point G1 will be described below. It is assumed in operation S100 that the mobile node H1 creates a tunnel with the global mobility tunnel point G1 in order to communicate with the node H4 of the local area 410; the global mobility tunnel point G1 is a home agent of the mobile node H1; a tunnel is created by the network 100 between the global mobility tunnel points G1 and G3; and a tunnel is already formed between the node H4 and the global mobility tunnel point G3.

In operation S110, the mobile node H1 is connected to the local mobility tunnel point L1. The mobile node H1 is connected to the local mobility tunnel point L1 in OSI layer 2 (data link). When the mobile node H1 is connected to the local mobility tunnel point L1, it delivers its ID and authentication request to the local mobility tunnel point L1 in operation S120.

In operation S130, the local mobility tunnel point L1 delivers the ID and binding update (BU) request of the connected mobile node H1 to the global mobility tunnel point G1. The global mobility tunnel point G1 delivers the ID and authentication query of the mobile node H1 to the authentication server 230 of the global mobility tunnel point G1 in operation S140. The authentication server 230 performs an authentication process based on the ID of the mobile node H1. The authentication server 230 performs the AAA on the mobile node H1. Once the mobile node H1 is authenticated, the authentication server 230 delivers an authentication reply, which represents that the mobile node H1 is authenticated, to the global mobility tunnel point G1 in operation S150. In operation S160, the global mobility tunnel point G1 transmits a signal (binding acknowledgement (BA)), which represents that binding is completed based on an authentication result from the authentication server 230, to the local mobility tunnel point L1.

The local mobility tunnel point L1 delivers an authentication reply signal to the mobile node H1 in response to the BA in operation S170 and the global mobility tunnel point G1 sets up a tunnel between the local mobility tunnel point L1 and the global mobility tunnel point G1 in operation S175. Once the tunnel between the global mobility tunnel point G1 and the local mobility tunnel point L1 is set up, the mobile node H1 may exchange packets with the node H4.

The mobile node H1 delivers a packet including ID of the target node H4 to the local mobility tunnel point L1 in operation S180. The local mobility tunnel point L1 delivers a packet including the ID of the target node H4 to the global mobility tunnel point G1 in operation S183. The global mobility tunnel point G1 converts the ID of the target node H4 in the packet into a locator corresponding to the ID of the target node H4. The global mobility tunnel point G1 transmits a packet including the locator corresponding to the ID of the target node H4 to the network 100. At least one router R of the network 100 delivers the packet to the global mobility tunnel point G3 based on the locator corresponding to the ID of the target node H4 in operation S185.

The global mobility tunnel point G3 converts the locator corresponding to the
ID of the target node H4 in the packet delivered from the network 100 into the ID of the target node H4. The global mobility tunnel point G3 delivers the packet to the target node H4 with reference to the ID of the target node H4 in operation S187.

It will be understood that a process, where the node H1 receives a packet from the node H4, will be the same as the above.

Figure 3:
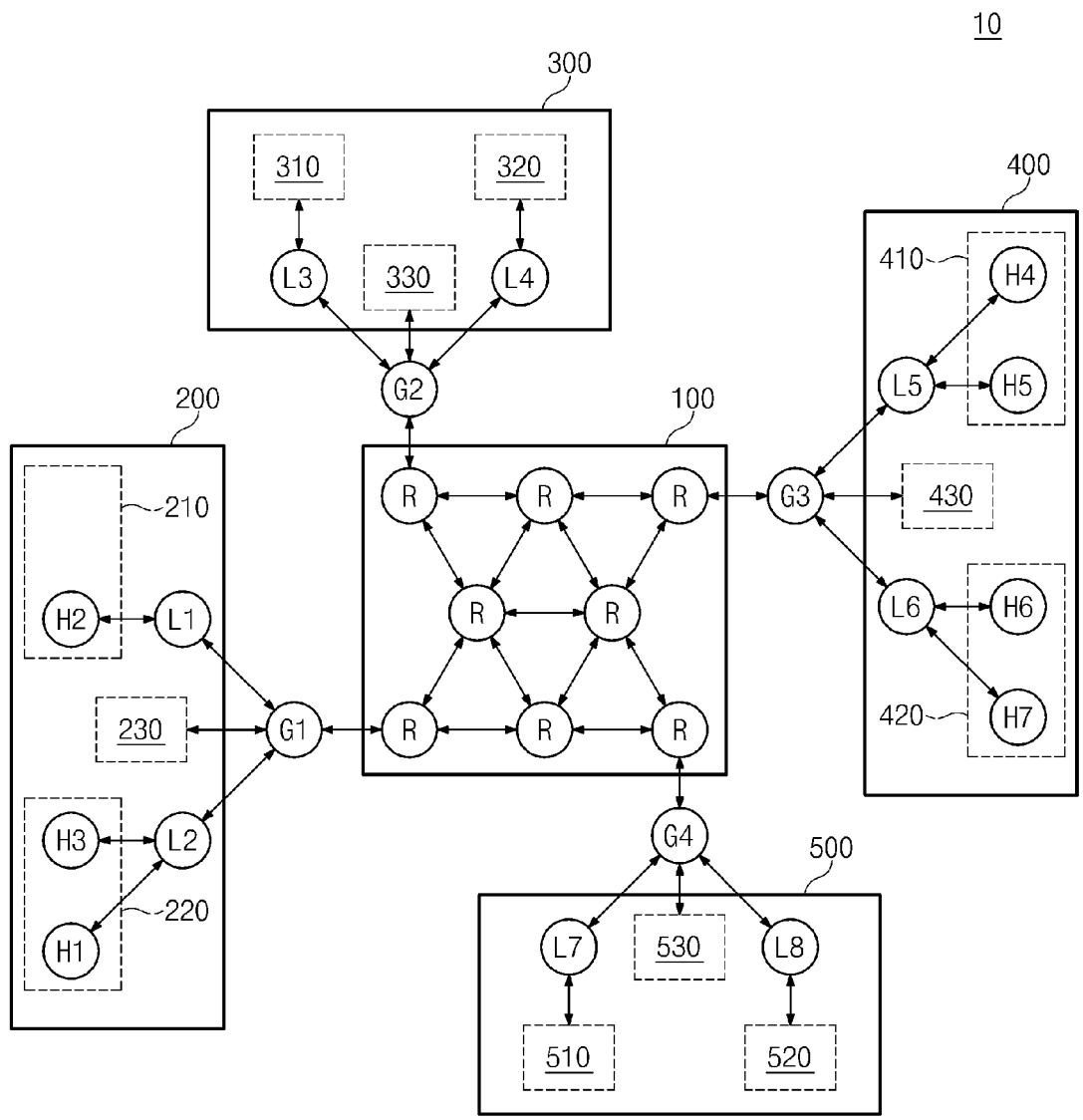
FIG. 3 is a block diagram illustrating a method of providing local mobility in the network system of FIG. 1.

FIG. 3 is a block diagram illustrating a method of providing local mobility in the network system 10 of FIG. 1. Comparing with the network system 10 of FIG. 1, the mobile node H1 moves from the local area 210, which is connected to the local mobility tunnel point L1, to the local area 220, which is connected to the local mobility tunnel point L2, in the network system 10 of FIG. 3. Once the mobile node H1 is connected to the local mobility tunnel point L2, it delivers its ID and authentication request to the local mobility tunnel point L2. The local mobility tunnel point L2 delivers the ID and authentication request of the mobile node H1 to the global mobility tunnel point G1.

The authentication server 230 of the global mobility tunnel point G1 performs an additional cache function. That is, the global mobility tunnel point G1 stores a fact that the mobile node H1 is connected to the local mobility tunnel point L1 and is authenticated by the global mobility tunnel point G1. The global mobility point G1 deletes a tunnel connected to the mobile node H1 through the local mobility tunnel point L1, and creates a new tunnel with the local mobility tunnel point L2. At this point, the mobile node H1 maintains the same ID as in the local area 210. That is, local mobility is provided to the mobile node H1 between the local areas 210 and 220.

Figure 4:
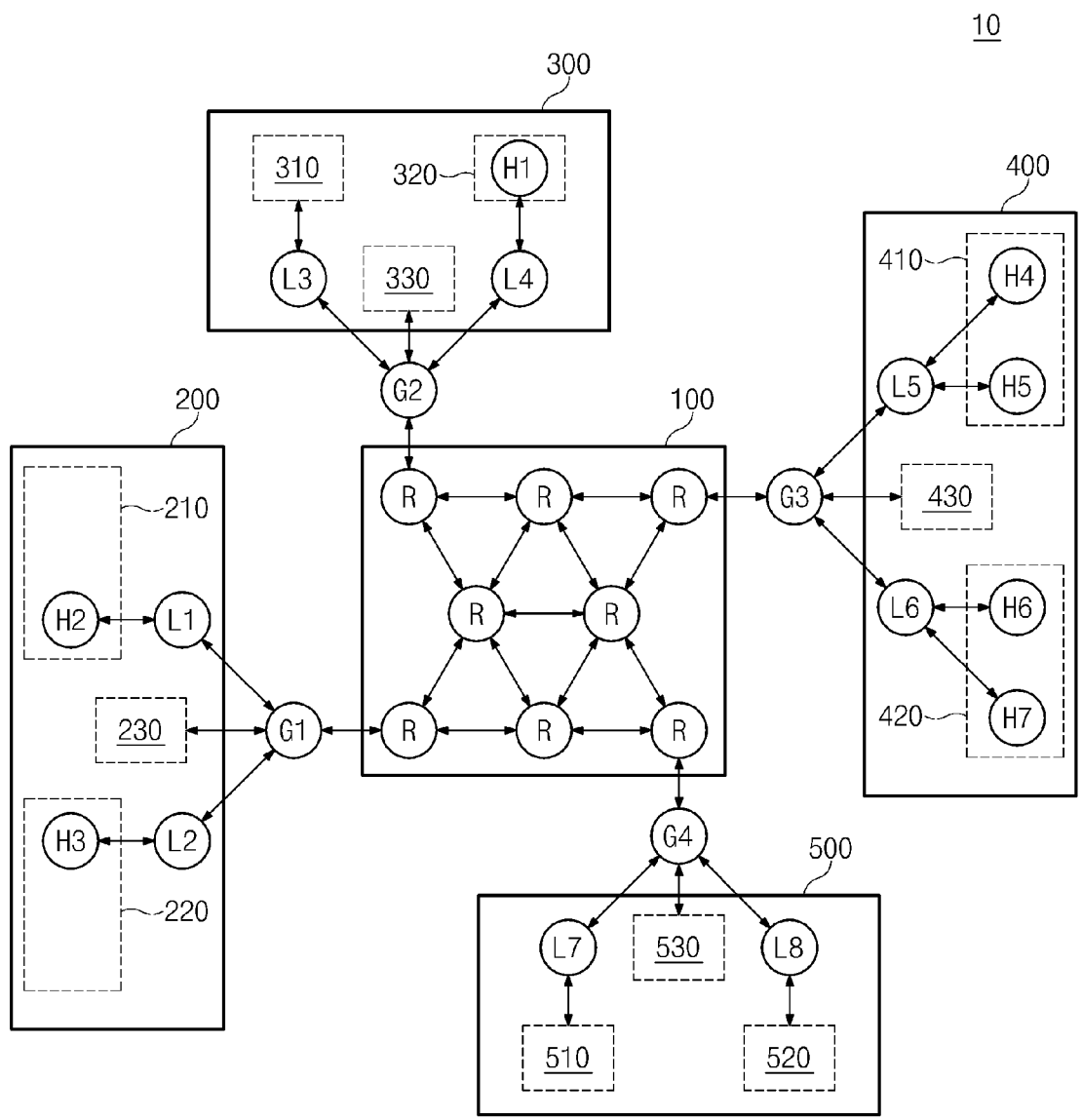
FIG. 4 is a block diagram illustrating a method of providing global mobility in the network system of FIG. 1.

FIG. 4 is a block diagram illustrating a method of providing global mobility in the network system 10 of FIG. 1. Comparing with the network system 10 of FIG. 1, the mobile node H1 moves from the local area 210 of the end area 200 connected to the global mobility tunnel point G1 to the local area 320 of the end area 300 connected to the global mobility tunnel point G2 in the network system 10 of FIG. 4.

Figure 5:
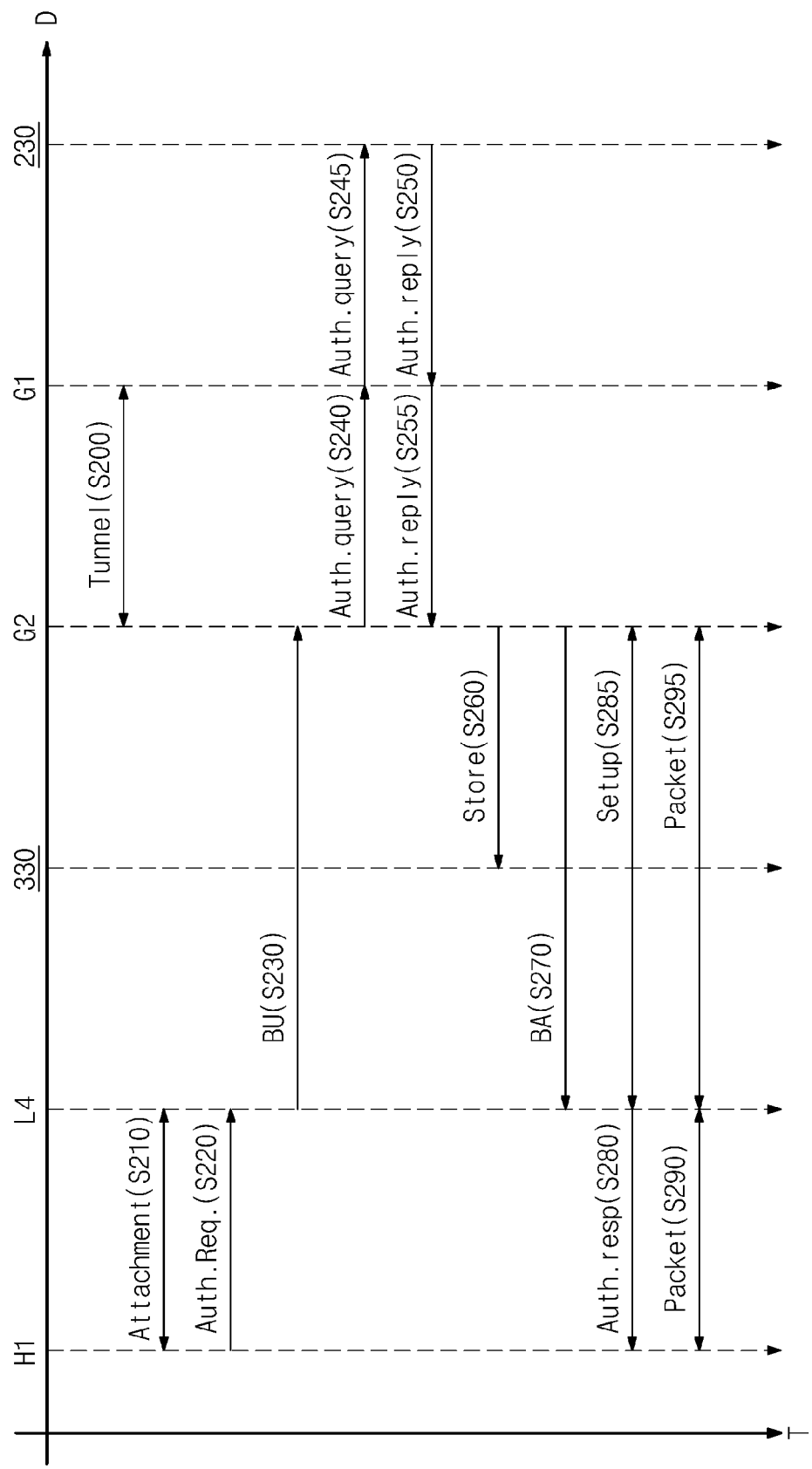
FIG. 5 is a diagram illustrating a method of providing mobility to a mobile node H1 in the network system of FIG. 4.

FIG. 5 is a diagram illustrating a method of providing mobility to the mobile node H1 in the network system 10 of FIG. 4. In FIG. 5, an x-axis represents components D of the network system 10 and a y-axis represents time.

Referring to FIGS. 4 and 5, it is assumed in operation S200 that a home agent of the mobile node H1 is the global mobility tunnel point G1 and the global mobility tunnel points G1 and G2 are connected to a tunnel through at least one router of the network 100.

In operation S210, the mobile node H1 is connected to the local mobility tunnel point L4. The mobile node H1 may be connected to the local mobility tunnel point L4 in open system interconnection (OSI) Layer 2 (data link). Once it is connected to the local mobility tunnel point L4, the mobile node H1 delivers the ID and authentication request of the node to the local mobility tunnel point L4.

In operation S230, the local mobility tunnel point L4 delivers the ID and BU request of the mobile node H1 to the global mobility tunnel point G2. The global mobility tunnel point G2 converts the ID of the mobile node H1 into a locator corresponding to the ID of the mobile node H1. The global mobility tunnel point G2 delivers the locator corresponding to the ID of the mobile node H1 and the authentication query to the network 100. At least one router R of the network 100 delivers the locator corresponding to the ID of the mobile node H1 and authentication query, based on the locator corresponding to the ID of the mobile node H1, to a home agent of the mobile node H1, that is, the global mobility tunnel point G1 in operation S240.

The global mobility tunnel point G1 converts the locator corresponding to the ID of the mobile node H1 into the ID of the mobile node H1. In operation S245, the global mobility tunnel point G1 delivers the authentication query and the ID of the mobile node H1 to the authentication server 230 of the global mobility tunnel point G1. The authentication server 230 authenticates the mobile node H1 using the ID of the mobile node H1. At this point, the authentication server 230 stores information representing that the mobile node H1 is connected to the global mobility terminal point G2. The authentication server 230 delivers an authentication reply to the global mobility tunnel point G1 in operation S250.

In operation S255, the global mobility tunnel point G1 delivers the locator corresponding to the ID of the mobile node H1 and authentication reply to the global mobility tunnel point G2 through the network 100. The global mobility tunnel point G2 stores information, which represents that the node H2 is authenticated, in the authentication server 330 of the global mobility tunnel point G2 in operation S260. Based on the authentication information of the mobile node H1 stored in the authentication server 330, the local mobility tunnel points L3 and L4 provide local mobility to the mobile node H1.

In operation S270, the global mobility tunnel point G2 delivers a BA signal to the local mobility tunnel point L4. The local mobility tunnel point L4 delivers an authentication reply to the mobile node H1 in operation S280, and the global mobility tunnel point G2 sets up a tunnel between the local mobility tunnel point L4 and the global mobility tunnel point G2 in operation S285.

Next, the mobile node H1 may communicate with the network 100 through the local mobility tunnel point L4 and the global mobility tunnel point G2. The mobile node H1 exchanges a packet with the local mobility tunnel point L4 in operation S290. Packets are exchanged between the local mobility tunnel point L4 and the global mobility tunnel point G2 in operation S295.

As mentioned above, when the mobile node H1 moves from the end area 200 to the end area 300, the global mobility tunnel pint G2 authenticates the mobile node H1 through the home agent of the mobile node H1, that is, the authentication server 230 of the global mobility tunnel point G1. Accordingly, the ID of the mobile node H1 allocated by the home agent G1 is maintained in the global mobility tunnel point G2. That is, the network system according to an embodiment of the present invention provides global mobility to the mobile node H1.

As described above, the network system 10 provides global mobility and local mobility. When a mobile node moves between local areas of the same end node, local mobility is provided to the mobile node. The local mobility is provided by the global mobility tunnel point of the end area where the mobile node is included.

When a mobile node moves between end areas, global mobility is provided to the mobile node. The global mobility is provided when a global mobility tunnel point of an end area where a mobile node is included is connected to a home agent of the mobile node via network including at least one router.

That is, local mobility with a fast response time is provided to a mobile node that moves within a short distance, and global mobility with cost effectiveness is provided to a mobile node that moves within a long distance. As a result, the mobility that the network 10 provides can be optimized.

In the above-mentioned embodiment, a tunnel between the global mobility tunnel points G1 to G4 is provided by at least one router of the network 100. However, the tunnel between the global mobility tunnel points G1 to G4 may be generated based on a locator corresponding to the ID of the target node when the locator corresponding to the ID of the target node is delivered to each of the global mobility tunnel points.

Figure 6:
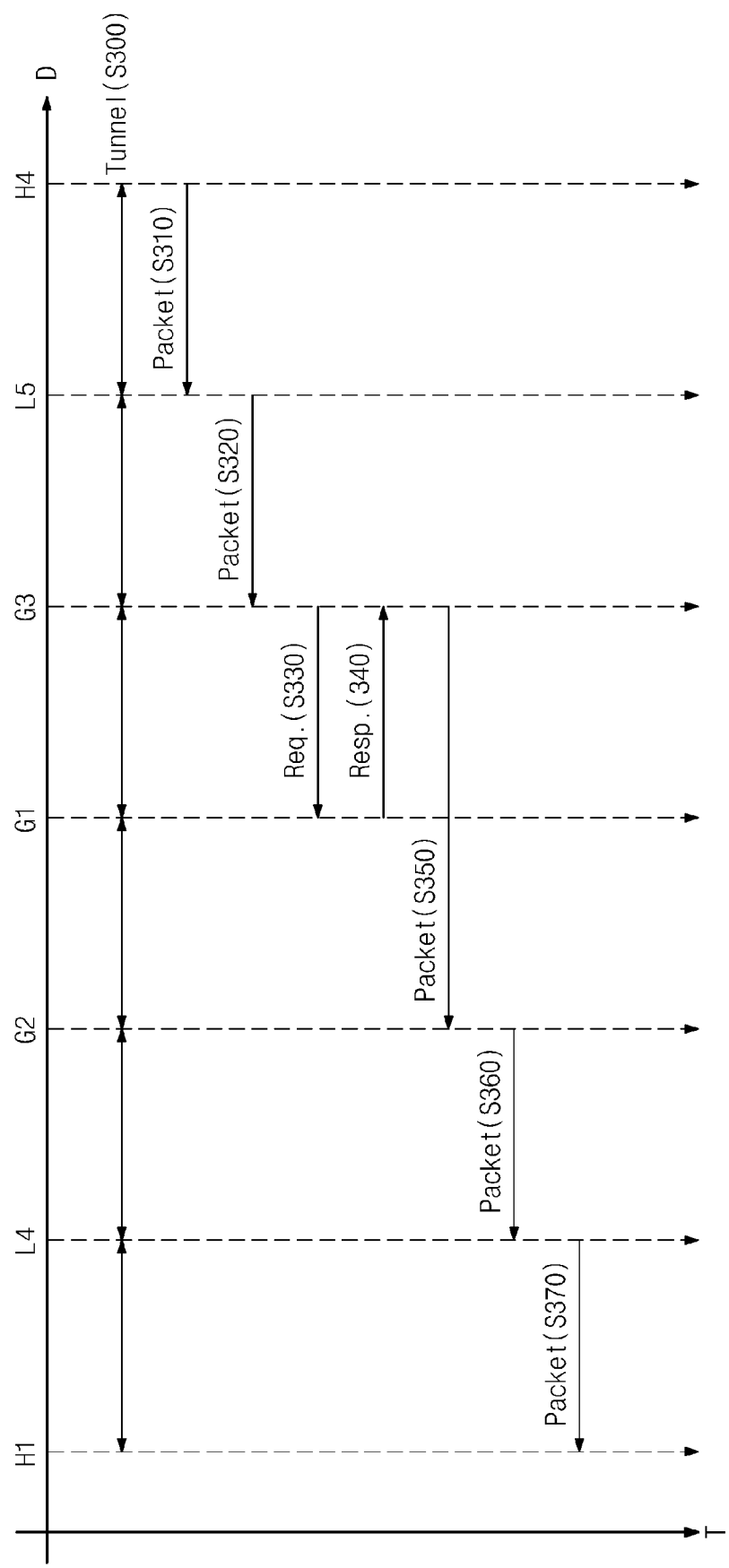
FIG. 6 is a diagram illustrating a method of transmitting a packet to a mobile node by a node in the network system of FIG. 4.

FIG. 6 is a diagram illustrating a method of transmitting a packet from the node H4 to the mobile node H1 in the network system 10 of FIG. 4. In FIG. 6, an x-axis represents components D of the network system 10 and a y-axis represents time T. In FIGS. 4 and 6, it is assumed in operation S300 that a tunnel between the node H4 and the mobile node H1 is already formed.

Referring to FIGS. 4 and 6, the node H4 of the end area 400 delivers a packet including the ID of the node H4 to the local mobility tunnel point L5. The local mobility tunnel point L5 delivers the packet including the ID of the node H4 to the global mobility tunnel point G3 in operation S320.

In operation S330, the global mobility tunnel point G3 requests ID of the mobile node H1 and locator mapping information from the home agent of the mobile node H1, that is, the global mobility tunnel point G1. As illustrated with reference to operation S245 of FIG. 5, information that the mobile node H1 is connected to the global mobility tunnel pint G2 is stored in the home agent of the mobile node H1, that is, the authentication server 230 of the global mobility tunnel point G1. The global mobility tunnel point G1 replies the information that the mobile node H1 is connected to the global mobility tunnel point G2 to the global mobility tunnel point G3 in operation S340.

In operation S350, the global mobility tunnel point G3 converts the ID of the mobile node H1 in the packet from the node H4 into a locator corresponding to the ID of the mobile node H1, based on information delivered from the global mobility tunnel point G1. The locator corresponding to the ID of the mobile node H1 represents that the mobile node H1 is connected to the global mobility tunnel point G2. The packet including the locator corresponding to the ID of the mobile node H1 is delivered to the global mobility tunnel point G2 via the network 100 in operation S350.

The global mobility tunnel point G2 converts the locator corresponding to the ID of the mobile node H1 to the ID of the mobile node H1. The global mobility tunnel point G2 delivers a packet including the ID of the mobile node H1 to the local mobility tunnel point L4 based on the ID of the mobile node H1 in operation S360. In operation S370, the local mobility tunnel point L4 delivers a packet including the ID of the mobile node H1 to the mobile node H1.

As mentioned above, when the packet is delivered to the mobile node H1, the global mobility tunnel point G3 connected to a packet transmitting node receives the ID of the mobile node H1 and mapping information of the locator from the home agent of the mobile node H1, that is, the global mobility tunnel point G1. Accordingly, it is possible to transmit the packet to the mobile node H1.

Figure 7:
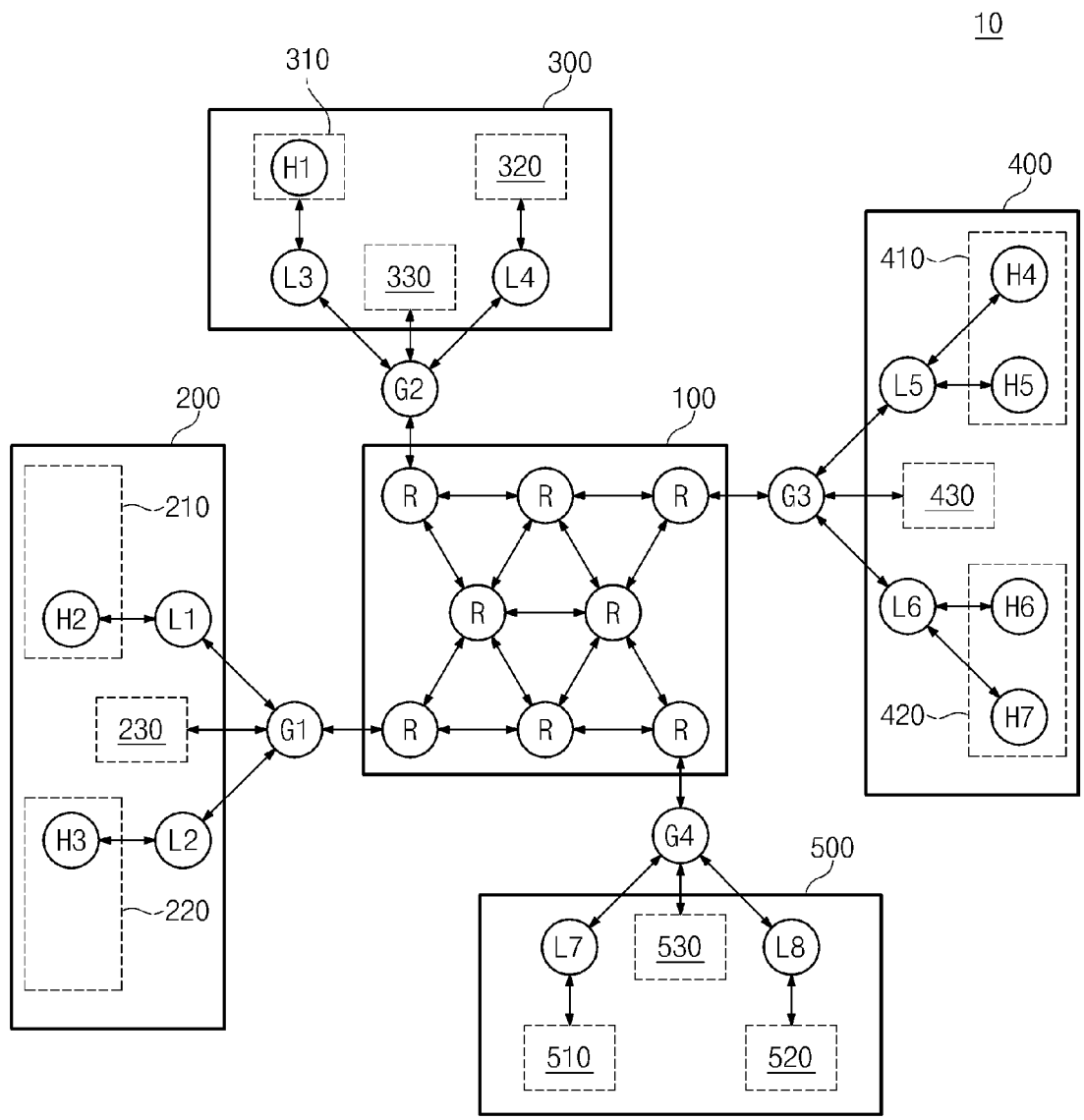
FIG. 7 is a block diagram illustrating a method of providing local mobility on a mobile node of FIG. 4.

FIG. 7 is a block diagram illustrating a method of providing local mobility to the mobile node H1 of FIG. 4. Comparing with the network system 10 of the FIG. 4, the mobile node H1 moves from the local area 320 connected to the local mobility tunnel point L4 to a local area 310 connected to the local mobility tunnel point L3.

The mobile node H1 delivers the ID of the mobile node H1 and authentication request to the local mobility tunnel point L3. The local mobility tunnel point L3 delivers the ID of the mobile node H1 and authentication request to the global mobility tunnel point G2.

As described with reference to operation S330 of FIG. 6, authentication information about the mobile node H1 is stored in the authentication server 330 of the global mobility tunnel point G2. That is, the global mobility tunnel point G2 deletes a tunnel that is connected between the mobile node H1 and the local mobility tunnel point L4, and creates a new tunnel with the mobile node H1 through the local mobility tunnel point L3.

As mentioned above, regardless of whether the mobile node H1 is connected to the home agent or the external agent, it is understood that the providing of local mobility to the mobile node H1 is performed through the global mobility tunnel point.

As mentioned above, a tunnel point according to the embodiment of the present invention supports separation of ID and a locator. Accordingly, the tunnel point provides routing scalability.

As described above, a tunnel point according to the embodiment of the present invention maintains ID of a mobile node. Accordingly, the tunnel point provides mobility.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operating a tunnel point which provides a tunnel between a router group including at least one router and a mobile node, the method comprising:
    providing a tunnel between the mobile node and the router group by authenticating the mobile node;
    receiving a packet including an identifier (ID) of a target node from the mobile node;
    converting the ID of the target node in the packet into a locator corresponding to the ID of the target node regardless of whether the mobile node is connected to a home agent or an external agent;
    transmitting a packet including the converted locator to the router group; and maintaining the ID of the mobile node by authenticating the mobile node through the router group when the mobile node is connected to another external terminal node, wherein a first tunnel point requests the ID of the mobile node and locator mapping information from a second tunnel point to which the home agent of the mobile node is connected, converts the ID of the mobile node into a locator of the mobile node based on the information delivered from the second tunnel point, and transmits a packet including the locator of the mobile node directly to a third tunnel point to which the external agent of the mobile node is connected.

2. The method of claim 1, wherein the tunnel point comprises an authentication server in order for authenticating the mobile node; and the providing of the tunnel between the mobile node and the router group comprises authenticating the mobile node by using the authentication server and the ID of the mobile node and providing a tunnel between the mobile node and the router group based on an authentication result.

3. The method of claim 2, when the mobile node is authenticated in order to provide a tunnel between the mobile node and the router group, further comprising allocating ID to the mobile node through the authentication server if there is no ID of the mobile node.

4. The method of claim 2, wherein the providing of the tunnel between the mobile node and the router group comprises, when the ID of the mobile node is not allocated by the tunnel point, requesting authentication of the mobile node to a tunnel point that allocates ID to the mobile node among external tunnel points.

5. The method of claim 4, wherein the providing of the tunnel between the mobile node and the router group comprises:

converting the ID of the mobile node into a locator; and transmitting the converted locator and an authentication request of the mobile node to the router group.

6. The method of claim 5, wherein the providing of the tunnel between the mobile node and the router group comprises, when an authentication message of the mobile node is delivered through the router group, providing a tunnel between the mobile node and the router group.

7. The method of claim 2, when a specific mobile node to which the tunnel point allocates ID is connected to another external tunnel point, further comprising storing specific mobile node information indicating that the mobile node to which the tunnel point allocates the ID is connected to another external tunnel point.

8. The method of claim 7, when a packet to be delivered from the router group to the specific mobile node is delivered, further comprising combining the packet to be delivered to the specific mobile node with a locator representing an external tunnel point to which the specific mobile node is connected, based on the specific mobile node information, in order to deliver a combined result to the router group.

9. The method of claim 2, wherein the tunnel point comprises:

a global tunnel point; and at least one local tunnel point connected to the global tunnel point, wherein:

the mobile node is connected to one of the at least one local tunnel point; and when the mobile node is connected to a first local tunnel point, the first local tunnel point delivers the ID of the mobile node to the global tunnel point, and the global tunnel point authenticates the mobile node using the ID of the mobile node and the authentication server.

10. The method of claim 9, wherein when the mobile node is separated from the first local tunnel point and is connected to a second local tunnel point, the ID of the mobile node is maintained.

11. The method of claim 8, when the packet including the locator corresponding to the tunnel point is delivered from the router group, further comprising:

converting the locator corresponding to the tunnel point into ID; and delivering the packet to the mobile node when the converted ID corresponds to the mobile node.

* * * * *